(12) United States Patent
Oikawa

(10) Patent No.: US 7,695,832 B2
(45) Date of Patent: Apr. 13, 2010

(54) PERPENDICULAR MAGNETIC RECORDING MEDIUM AND PERPENDICULAR MAGNETIC RECORDING/REPRODUCING APPARATUS

(75) Inventor: Soichi Oikawa, Hachioji (JP)

(73) Assignee: Kanushiki Kaisha Toshiba, Tokyo (JP)

( * ) Notice: Subject to any disclaimer, the term of this patent is extended or adjusted under 35 U.S.C. 154(b) by 911 days.

(21) Appl. No.: 11/441,184

(22) Filed: May 26, 2006

(65) Prior Publication Data

US 2006/0269794 A1 Nov. 30, 2006

(30) Foreign Application Priority Data

May 27, 2005 (JP) .............................. 2005-155996

(51) Int. Cl.
*G11B 5/66* (2006.01)

(52) U.S. Cl. ..................................... 428/831

(58) Field of Classification Search ........................ None
See application file for complete search history.

(56) References Cited

U.S. PATENT DOCUMENTS

| 6,846,582 | B2 | 1/2005 | Onuma et al. | |
| 6,936,352 | B2 * | 8/2005 | Ohsawa et al. | 428/611 |
| 7,494,617 | B2 * | 2/2009 | Ziani | 419/19 |

FOREIGN PATENT DOCUMENTS

| JP | 10-233014 | 9/1998 |
| JP | 2001-052330 | 2/2001 |
| JP | 2001-155329 | 6/2001 |
| JP | 2003-036525 | 2/2003 |
| JP | 2003-059037 | 2/2003 |
| JP | 2003-059037 A | 2/2003 |
| JP | 3423907 | 4/2003 |
| JP | 2004-146029 | 5/2004 |
| JP | 2005-032352 | 2/2005 |
| JP | 2005-32358 | 2/2005 |
| WO | WO2005/006310 | * 1/2005 |

OTHER PUBLICATIONS

Minghui et al., Journal of Applied Physics, Structural and morphological control of nanosized Cu islands on $SiO_2$ using a Ti under layer, vol. 94, No. 5, p. 3492-3497 dated Sep. 1, 2003.
Chinese Office Action dated Jul. 27, 2007 for Appln. No. 2006100846754.
Japanese Office Action dated Sep. 15, 2009.

* cited by examiner

*Primary Examiner*—Holly Rickman
(74) *Attorney, Agent, or Firm*—Pillsbury Winthrop Shaw Pittman, LLP

(57) ABSTRACT

In a perpendicular magnetic recording medium, a multilayered underlayer including a first metal underlayer, a second metal underlayer having no solid solution properties with respect to the first metal underlayer and having a hole, and a third metal underlayer having solid solution properties with respect to the first metal underlayer and having no solid solution properties with respect to the second metal underlayer is formed on a substrate, and a magnetic recording layer is formed on the multilayered underlayer.

18 Claims, 9 Drawing Sheets

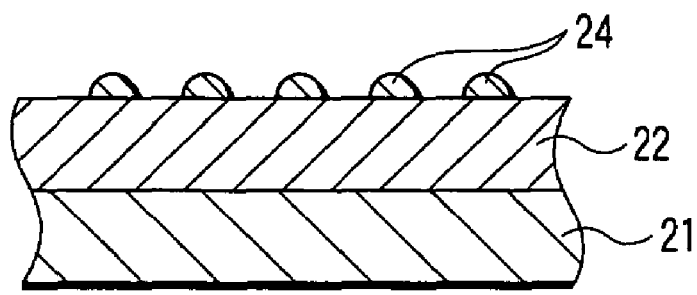
F I G. 16
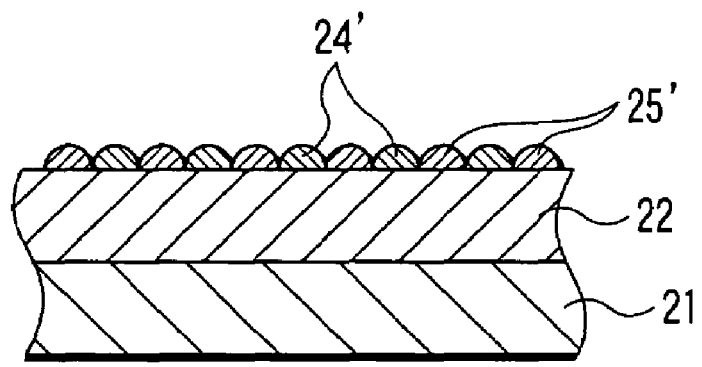
F I G. 17
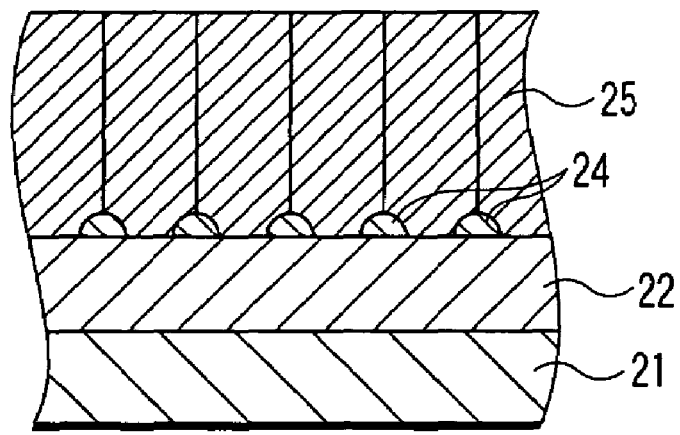
F I G. 18

PERPENDICULAR MAGNETIC RECORDING MEDIUM AND PERPENDICULAR MAGNETIC RECORDING/REPRODUCING APPARATUS

CROSS-REFERENCE TO RELATED APPLICATIONS

This application is based upon and claims the benefit priority of from Japanese Patent Application No. 2005-155996, filed May 27, 2005, the entire contents of which are incorporated herein by reference.

BACKGROUND

1. Field

The present invention relates to a perpendicular magnetic recording medium for use in, e.g., a hard disk drive using the magnetic recording technique, and a perpendicular magnetic recording/reproducing apparatus.

2. Description of the Related Art

Recent hard disk drives have become smaller and smaller, and a product having a disk diameter of 1 inch. or less has been proposed. In addition, to realize an inexpensive, high-speed, large-capacity recording medium, the recording density is required to further increase. One of the most effective methods of increasing the areal recording density of a magnetic recording medium is to reduce noise by reducing the size of the magnetic crystal grains in the magnetic recording layer. Conventionally, in a method of stacking thin films by using sputtering, size is reduced by changing the thin film materials or optimizing the thin film formation conditions. However, in the method of simply stacking thin films, the grain size is often naturally determined and cannot be unconditionally controlled. For example, the average grain diameter of an underlayer below the magnetic recording layer is about 8 nm. Also, when a granular recording layer is used as the magnetic recording layer, the average grain diameter can be reduced to about 6 nm, but further reduction has been found to be very difficult.

Although it is being attempted to further reduce the crystal grain size of the magnetic crystal grains by using a granular structure in which the grains are segregated in an amorphous matrix, the crystal grains did not easily grow into columns, the crystal orientation readily deteriorated, and the crystal grain density was low by using this method. It is preferable that the degree of crystal orientation of the magnetic crystal grains is as high as possible, and the orientation variance is as low as possible. In the granular structure described above, however, the crystal orientation generally worsens and often becomes random, and this greatly increases the medium noise. Also, the crystal grains sometimes grow into spheres instead of columns. Even when the crystal grains grow satisfactorily into columns and relatively uniform nuclei form on the upper surface of the underlayer, some crystal grains often become enlarged, inhibit growth, or subsequently combine with other grains. As described above, it is generally difficult to grow magnetic recording crystal grains while a predetermined grain size is material in the direction of thickness of the magnetic recording layer.

Also, the magnetic recording layer is becoming thinner and thinner, and the signal output lower and lower. Therefore, if the crystal grain density greatly decreases, it is necessary to greatly increase the saturation magnetization of the magnetic crystal grains in order to maintain the output. To increase the saturation magnetization, a large change in composition is generally required. However, the segregated structure and crystal orientation are often disrupted, increases the medium noise, so this method is also not easy to put into practice.

In addition, as described in, e.g., Jpn. Pat. Appln. KOKAI Publication Nos. 2001-52330 and 2003-59037, it has been proposed to form small island-like nuclei on the underlayer or substrate, and epitaxially grow magnetic crystal grains or grow the grains into columns from these nuclei, thereby reducing the size of the grains. The size of the nuclei can be reduced in principle by reducing the formation amount of the nuclei. However, the individual crystal grains, having grown from the nuclei, enlarge in the in-plane direction until the gaps between adjacent nuclei are filled, unless the granular structure as described above is used. It seems possible, as a model, to imagine the high density of the nuclei. In practice, however, it is physically very difficult to realize a state in which fine nuclei spread such that they do not form a continuous film but separate from each other, in case of depositing, on the nuclei, magnetic crystal grains in an amount with which a continuous film can be formed. Generally, a continuous film is formed, or large islands are formed at low density.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 16 is a model view showing another example of the way the third metal grains deposit on the second metal underlayer;

FIG. 17 is a model view showing the other example of the way the third metal grains deposit on the second metal underlayer; and FIG. 18 is a model view showing the other example of the way the third metal grains deposit on the second metal underlayer.

DETAILED DESCRIPTION

Various embodiments according to the invention will be described hereinafter with reference to the accompanying drawings. In general, according to one embodiment of the invention, a perpendicular magnetic recording medium of the present invention has a substrate, a multilayered underlayer formed on the substrate, and a magnetic recording layer formed on the multilayered underlayer. The multilayered underlayer includes a first metal underlayer, a second metal underlayer formed on the first metal underlayer and having one or a plurality of holes, and a third metal underlayer formed on the second metal underlayer, having solid solution properties with respect to the first metal underlayer, and having no solid solution properties with respect to the second metal underlayer.

The first metal underlayer can be exposed to the holes. Alternatively, a layer containing an arbitrary component can be formed in the holes. In this manner, the regions in the holes of the second metal underlayer function as nuclei when the third metal underlayer is grown. In the present invention, when the third metal underlayer is grown on the second metal underlayer and on the nuclei, crystal grains can be grown into columns while enlargement in the in-plane direction is suppressed and a high degree of crystal orientation and a small crystal grain size are maintained. This makes it possible to reduce the medium noise and increase the areal recording density.

Figure 1:
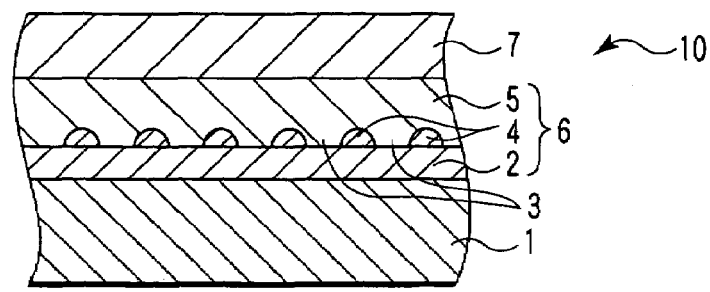
FIG. 1 is a schematic view showing the sectional structure of an example of a perpendicular magnetic recording medium according to the present invention.

FIG. 1 is a schematic view showing the sectional structure of an example of the perpendicular magnetic recording medium according to the present invention.

As shown in FIG. 1, a perpendicular magnetic recording medium 10 has a substrate 1, multilayered underlayer 6, and perpendicular magnetic recording layer 7. The multilayered underlayer 6 includes a first metal underlayer 2 formed on the substrate 1, a discontinuous second metal underlayer 4 formed on the first metal underlayer 2, having a plurality of holes 3, and made of a plurality of metal grains arranged at intervals corresponding to the holes 3, and a third metal underlayer 5 formed in the regions of the holes 3 and on the second metal underlayer 4. The perpendicular magnetic recording layer 7 is formed on the third metal underlayer 5.

Also, the second metal underlayer having one or a plurality of holes used in the present invention includes a discontinuous layer such as an island-like structure. Portions between islands partially connect to each other, and a portion surrounded by the islands forms a typical hole shape. The arrangement of a plurality of metal grains shown in FIG. 1 is merely an example, and it is also possible to separately arrange individual metal grains and/or a plurality of aggregates made of metal grains formed with no spacings between them.

In one embodiment of the present invention, the second metal underlayer has a plurality of holes.

In some embodiment of the present invention, the width of the hole is 1 nm or more at the narrowest portion and 80 nm or less at the widest portion.

If the hole width is less than 1 nm at the narrowest portion, the grain size of the third metal underlayer grown on the first metal underlayer exposed from the hole becomes less than 1 nm, and this tends to make the crystallinity unsatisfactory. If the hole width exceeds 80 nm at the widest portion, no fine grain effect can be obtained, so the suppression of enlargement of grains in the longitudinal direction tends to become insufficient.

In one embodiment of the present invention, the ratio of the area occupied by the holes when the second metal underlayer is viewed vertically from above is 10% to 90%.

If the ratio is less than 10%, most of the third metal underlayer tends to be formed on the second metal underlayer. If the ratio exceeds 90%, enlargement in the longitudinal direction of the crystal grains in the third metal underlayer tends to be suppressed any longer. This tends to make it impossible to obtain the effect of decreasing the grain size.

The metal underlayer having the holes can be formed by, e.g., sputtering or vacuum evaporation. Alternatively, an island-like surface structure can be artificially formed by using physical processing or a chemical reaction.

In one embodiment of the present invention, a 10-point average roughness Rz of the surface of the second metal underlayer is 0.2 to 20 nm. If the surface roughness Rz is less than 0.2 nm, it tends to be impossible to stop the growth in the longitudinal direction of the crystal grains in the third metal underlayer. If the surface roughness Rz exceeds 20 nm, the effect of planarizing the surface by burying the third metal underlayer in valleys does not tend to function well. This often increases the surface roughness of both the magnetic recording layer and protective layer, and adversely affects the stable floating of a head.

In one embodiment of the present invention, the first metal underlayer has a hexagonal close packed structure or face-centered cubic lattice structure.

The first metal underlayer can be a member selected from the group consisting of, e.g., titanium, nickel, palladium, and platinum.

In one embodiment of the present invention, the second metal underlayer and the third metal underlayer have a hexagonal close packed structure or face-centered cubic lattice structure.

In one embodiment of the present invention, the second metal underlayer can be a member selected from the group consisting of copper, silver, and gold.

In some embodiment of the present invention, the second metal underlayer is copper.

In one embodiment of the present invention, copper has no solid solution properties with respect to any of titanium, nickel, palladium, and platinum used as the first layer.

Also, when copper is used as the second metal underlayer, the size of the atom of copper is close to that of Co or Fe often used as a main component of the magnetic recording layer, and their lattice constants are also close depending on the crystal structure. Therefore, high crystallinity can be easily obtained even through an appropriately selected third metal underlayer as an interlayer.

For example, when a Ti layer is used as the first metal underlayer and Cu grows on this Ti layer, fine islands can be formed under normal sputtering conditions as described in detail from the viewpoint of the interface interaction in "Journal of Applied Physics", Vol. 94, pp. 3492 (2003).

As the third metal underlayer, it is possible to use a metal having solid solution properties with respect to the first metal underlayer, and having no solid solution properties with respect to the second metal underlayer.

As the third metal underlayer, it is possible to use, e.g., Ti, Cr, Co, Ni, Cu, Ru, Rh, Pd, Ag, Pt, Au, and alloys mainly containing these metals.

In one embodiment of the present invention, the third metal underlayer is ruthenium.

Note that the solid solution properties used herein are properties by which, in a binary phase diagram of a metal, the metal forms a solid solution at a ratio of 2 at % or more within a range lower than the temperature at which the metal forms a liquid phase. If the metal forms a solid solution at a ratio of less than 2 at %, the metal has no solid solution properties.

Figure 2:
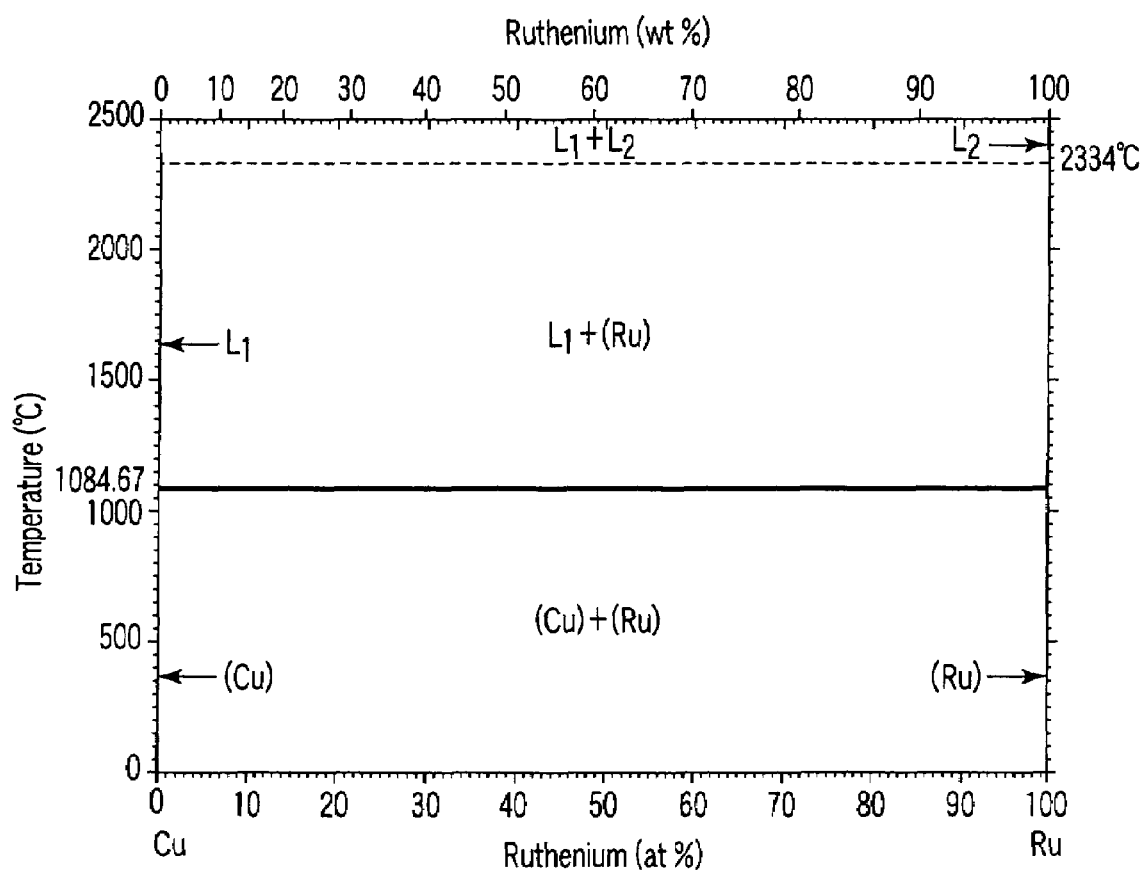
FIG. 2 is a first example of a binary phase diagram of metals usable in the present invention.
Figure 3:
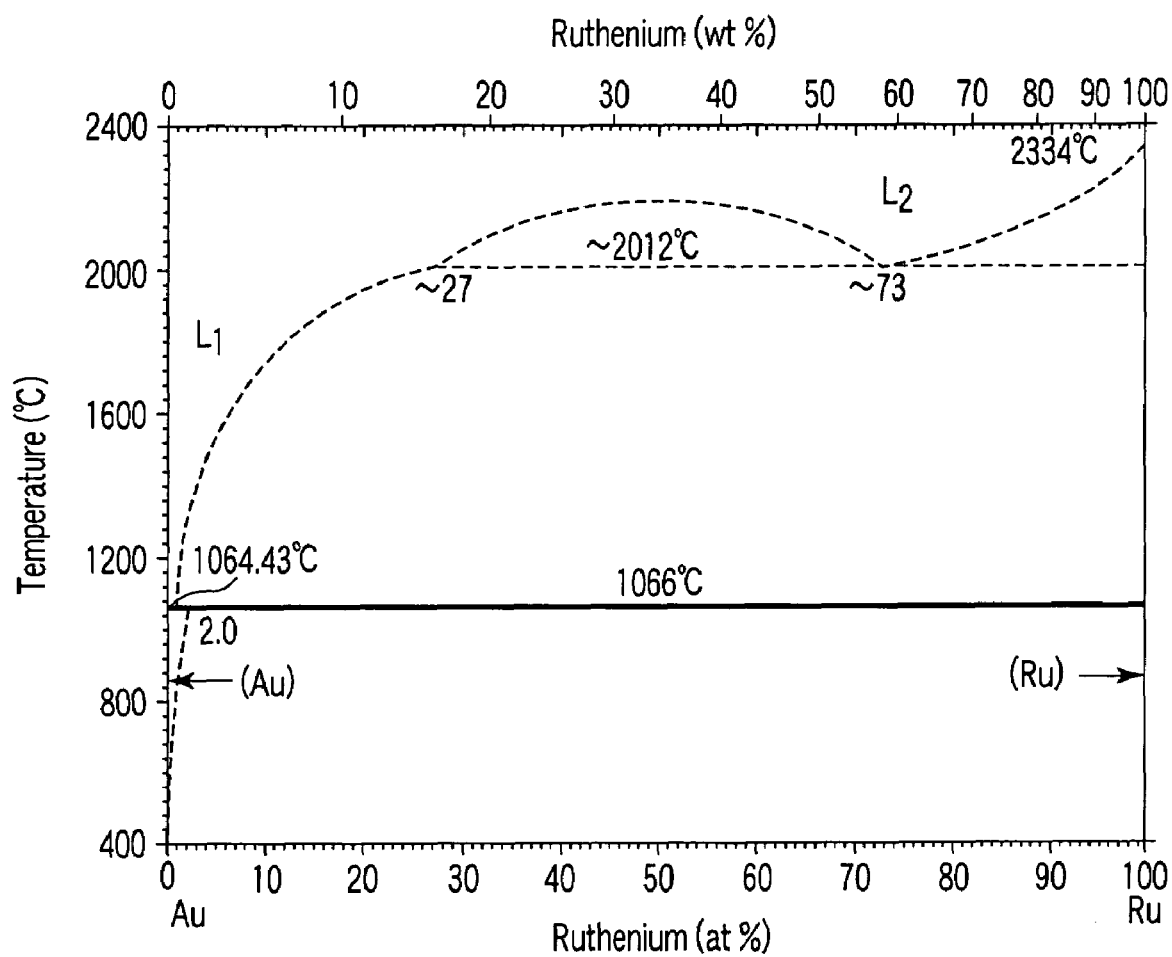
FIG. 3 is a second example of a binary phase diagram of metals usable in the present invention.
Figure 4:
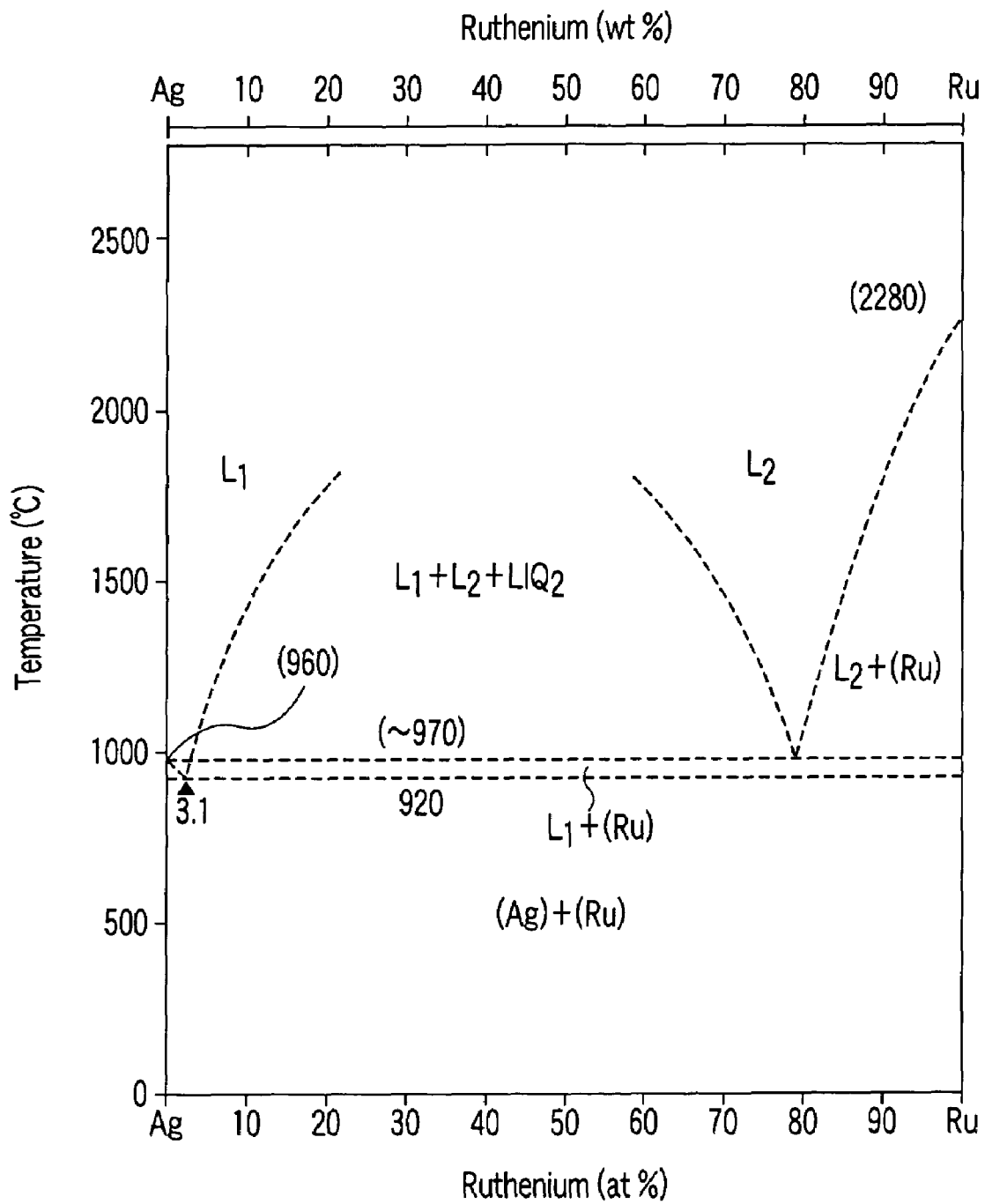
FIG. 4 is a third example of a binary phase diagram of metals usable in the present invention.

FIGS. 2 to 4 illustrate examples of binary alloy phase diagrams of metals usable in the present invention.

FIG. 2 shows an example of a binary phase diagram of ruthenium and copper.

In FIG. 2, reference symbol $L_1$ denotes a liquid phase mainly containing Cu; and $L_2$, a liquid phase mainly containing Ru. As shown in FIG. 2, at a temperature of 1,084.67° C. or less, ruthenium and copper have almost no composition range within which they form an alloy, i.e., have no solid solution properties. (Cu)+(Ru) indicates the state in which Cu and Ru form solid phases and do not mix. Cu and Ru partially form liquid phases if the temperature exceeds 1,084.67° C., and completely change into liquid phases if the temperature exceeds 2,334° C. $L_1+L_2$ indicates the state in which Cu and Ru do not mix even in the form of a liquid.

FIG. 3 shows an example of a binary phase diagram of ruthenium and gold.

In FIG. 3, $L_1$ denotes a liquid phase mainly containing Au; and $L_2$, a liquid phase mainly containing Ru. As shown in FIG. 3, ruthenium and gold have a region where they form an alloy at a temperature of 1,064° C. or less. However, ruthenium and gold have no solid solution properties because the composition range is about 2 at % or less.

FIG. 4 shows an example of a binary phase diagram of ruthenium and silver.

In FIG. 4, $L_1$ denotes a liquid phase mainly containing Ag; and $L_2$, a liquid phase mainly containing Ru. As shown in FIG. 4, at a temperature of 920° C. or less, ruthenium and silver have no region where they can form an alloy, i.e., have no solid solution properties.

The average crystal grain diameter of ruthenium is less than 8 nm. In one embodiment of the present invention, the average crystal grain diameter of ruthenium is 1 to 8 nm.

If the average crystal grain diameter of ruthenium exceeds 8 nm, it is often impossible to obtain the medium noise reducing effect.

In the holes of the second metal underlayer, an oxide layer can be further formed as the arbitrary component described above.

Figure 5:
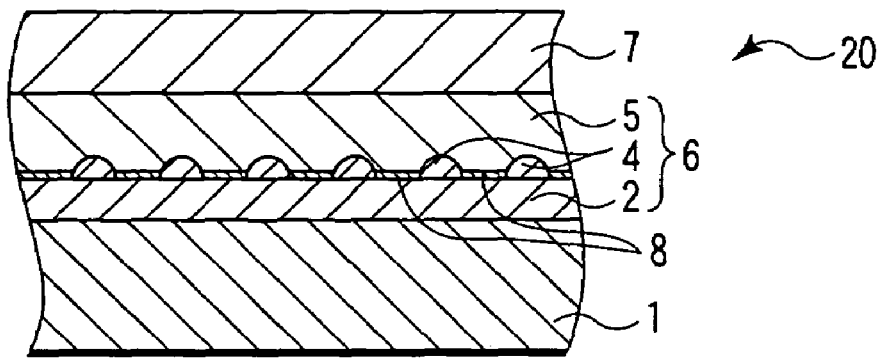
FIG. 5 is a schematic sectional view showing another example of the perpendicular magnetic recording medium according to the present invention.

FIG. 5 is a schematic sectional view showing another example of the perpendicular magnetic recording medium according to the present invention.

As shown in FIG. 5, a perpendicular magnetic recording medium 20 has the same structure as shown in FIG. 1 except that an oxide layer 8 exists on the first metal underlayer in the regions of the holes 3. The oxide layer 8 can partially or entirely block the contact between the first and third metal underlayers in the regions of the holes 3. However, if the oxide layer 8 is made sufficiently thin, the third metal underlayer is perhaps practically well influenced by the first metal underlayer owing to oxidation and diffusion to the upper and lower layers.

Examples of the oxide are silicon oxide, chromium oxide, and titanium oxide.

In some embodiment of the present invention, the oxide is titanium oxide.

When titanium oxide is used as the oxide, the crystallinity does not easily worsen even if this oxide layer is formed between the first and third metal underlayers having a close packed crystal structure.

In one embodiment of the present invention, the volume of the oxide is 10 to 50 vol % with respect to the total volume of the first metal underlayer and oxide.

In one embodiment of the present invention, the volume of titanium oxide is 20 to 50 vol %.

The oxide can be formed simultaneously with the formation of the second metal underlayer by sputtering by using an oxide target together with the target used for the second metal underlayer.

As the substrate, it is possible to use, e.g., a glass substrate, an Al-based alloy substrate, a ceramic substrate, a carbon substrate, an Si single-crystal substrate having an oxidized surface, or a substrate obtained by plating any of theses substrates with NiP or the like.

Examples of the glass substrate are amorphous glass and crystallized glass, and general-purpose soda-lime glass or aluminosilicate glass can be used as the amorphous glass. Also, lithium-based crystallized glass can be used as the crystallized glass. As the ceramic substrate, it is possible to use, e.g., sintered materials mainly containing general-purpose aluminum oxide, aluminum nitride, and silicon nitride, and fiber-reinforced materials of these sintered materials.

As the substrate, it is also possible to use a substrate obtained by forming an NiP layer on the surface of the metal substrate or non-metal substrate described above by plating or sputtering.

Furthermore, although only sputtering will be taken as an example of a method of forming thin films on the substrate in the following explanation, the same effect can be obtained by vacuum evaporation or electroplating.

In the perpendicular magnetic recording medium of the present invention, a soft magnetic layer can be formed between the substrate and multilayered underlayer.

Figure 6:
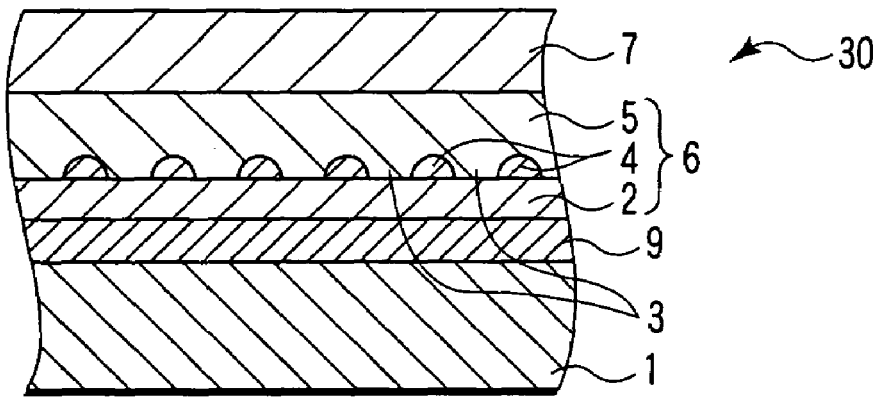
FIG. 6 is a schematic view showing the sectional structure of still another example of the perpendicular magnetic recording medium of the present invention.

FIG. 6 is a schematic view showing the sectional structure of still another example of the perpendicular magnetic recording medium of the present invention.

As shown in FIG. 6, a perpendicular magnetic recording medium 30 has the same structure as FIG. 1 except that a soft magnetic backing layer 9 is further formed between the substrate 1 and multilayered underlayer 6. Note that in FIG. 6, the regions of the holes 3 are filled with the third metal underlayer. However, as shown in FIG. 5, the oxide 8 may also be formed on the first metal underlayer 2 in the regions of the holes 3.

By forming a high-permeability soft magnetic backing layer, a so-called double-layered perpendicular medium having the perpendicular magnetic recording layer on the soft magnetic backing layer is formed. In this double-layered perpendicular medium, the soft magnetic backing layer horizontally passes a recording magnetic field from a magnetic head, e.g., a single-pole head for magnetizing the perpendicular magnetic recording layer, and returns this recording magnetic field to the magnetic head, thereby performing a part of the function of the magnetic head. That is, the soft magnetic backing layer can increase the recording/reproduction efficiency by applying a sufficient steep perpendicular magnetic field to the magnetic recording layer.

As the soft magnetic backing layer, materials containing Fe, Ni, and Co can be used. Examples are FeCo-based alloys such as FeCo and FeCoV, FeNi-based alloys such as FeNi, FeNiMo, FeNiCr, and FeNiSi, FeAl-based alloys, FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN.

It is also possible to use a material having a microcrystal structure such as FeAlO, FeMgO, FeTaN, or FeZrN containing 60 at % or more of Fe, or a granular structure in which fine crystal grains are dispersed in a matrix.

As another material of the soft magnetic baking layer, it is possible to use a Co alloy containing Co and at least one of Zr, Hf, Nb, Ta, Ti, and Y. In one embodiment of the present invention, 80 at % or more of Co is contained. This Co alloy readily forms an amorphous layer when a film of the alloy is formed by sputtering. The amorphous soft magnetic material shows very high soft magnetism because the material has none of crystal magnetic anisotropy, crystal defects, and a grain boundary. It is also possible to reduce the medium noise by using this amorphous soft magnetic material.

Examples of the amorphous soft magnetic material are CoZr-, CoZrNb-, and CoZrTa-based alloys. B can be further added to these materials to, e.g., allow easy formation of amorphous.

A CoPt-based alloy or the like can be used as the perpendicular magnetic recording layer.

In one embodiment of the present invention, the ratio of Co to Pt in the CoPt-based alloy is 2:1 to 9:1 in order to obtain a high uniaxial crystal magnetic anisotropy Ku. In some embodiment of the present invention, the CoPt-based alloy contains at least Cr or oxygen.

Oxygen can be added as an oxide. This oxide is particularly preferably at least one member selected from the group consisting of silicon oxide, chromium oxide, and titanium oxide.

In one embodiment of the present invention, magnetic crystal grains are dispersed in the perpendicular magnetic recording layer. In some embodiment of the present invention, the magnetic crystal grains have a columnar structure which vertically extends through the perpendicular magnetic recording layer. The formation of this structure can improve the orientation and crystallinity of the magnetic crystal grains in the perpendicular magnetic recording layer. As a consequence, a signal-to-noise ratio suited to high-density recording can be obtained.

In one embodiment of the present invention, the content of the oxide for obtaining this structure is 3 to 20 mol % with respect to the total amount of Co, Cr, and Pt. In some embodiment of the present invention, the content is 5 to 18 mol %. These ranges are favorable as the content of the oxide in the perpendicular magnetic recording layer because the oxide separates out around the magnetic crystal grains when the layer is formed, so the magnetic crystal grains can be isolated and made fine.

If the content of the oxide in the perpendicular magnetic recording layer exceeds 20 mol %, the oxide remains in the magnetic crystal grains to deteriorate the orientation and crystallinity of the magnetic crystal grains. In addition, the oxide separates out above and below the magnetic crystal grains to often make them unable to form a columnar structure which vertically extends through the perpendicular magnetic recording layer. If the content of the oxide is less than 3 mol %, the magnetic crystal grains are insufficiently separated and made fine. Consequently, the recording/reproduction noise increases to often make it impossible to obtain a signal-to-noise ratio suited to high-density recording.

In one embodiment of the present invention, the content of Cr in the perpendicular magnetic recording layer is 0 to 30 a t %. In some embodiment of the present invention, the content is 2 to 28 at %. If the Cr content falls within these ranges, the uniaxial crystal magnetic anisotropy Ku of the magnetic crystal grains does not excessively decrease, and high magnetization is maintained. As a result, recording/reproduction characteristics suitable for high-density recording and satisfactory thermal decay characteristics can be obtained.

If the Cr content exceeds 28 at %, the Ku of the magnetic crystal grains decreases, and this worsens the thermal decay characteristics. In addition, since magnetization decreases to lower the reproduced signal output, the recording/reproduction characteristics often deteriorate.

In one embodiment of the present invention, the content of Pt in the perpendicular magnetic recording layer is 10 to 25 at %. The Pt content preferably falls within the above range because it is possible to obtain Ku necessary for the perpendicular magnetic layer and improve the crystallinity and orientation of the magnetic crystal grains, and as a consequence thermal decay characteristics and recording/reproduction characteristics suited to high-density recording are obtained.

If the Pt content exceeds 25 at %, a layer having an fcc structure forms in the magnetic crystal grains, and often deteriorates the crystallinity and orientation. If the Pt content is less than 10 at %, Ku for obtaining thermal decay characteristics suitable for high-density recording cannot be obtained in many cases.

In addition to Co, Cr, Pt, and the oxide, the perpendicular magnetic recording layer can further contain one or more types of elements selected from B, Ta, Mo, Cu, Nd, W, Nb, Sm, Tb, Ru, and Re as additive components. When these elements are contained, it is possible to promote forming of the fine magnetic crystal grains or improve the crystallinity and orientation of the grains, and obtain recording/reproduction characteristics and thermal decay characteristics more suited to high-density recording.

In one embodiment of the present invention, the total content of the additive components is 8 at % or less. If the content exceeds 8 at %, a phase other than an hcp phase forms in the magnetic crystal grains and disturbs the crystallinity and orientation of the magnetic crystal grains. Consequently, recording/reproduction characteristics and thermal decay characteristics suitable for high-density recording cannot be obtained in many cases.

As the perpendicular magnetic recording layer, it is also possible to use, instead of the alloys described above, other CoPt-based alloys, CoCr-based alloys, CoPtCr-based alloys, CoPtO, CoPtCrO, CoPtSi, CoPtCrSi, multilayered structures of Co and alloys mainly containing at least one element selected from the group consisting of Pt, Pd, Rh, and Ru, and CoCr/PtCr, CoB/PdB, and CoO/RhO obtained by adding Cr, B, and O to these multilayered structures.

In one embodiment of the present invention, the thickness of the perpendicular magnetic recording layer is 3 to 60 nm. In some embodiment of the present invention, the thickness is 5 to 40 nm. When the thickness falls within these ranges, a magnetic recording/reproducing apparatus can operate as an apparatus more suitable for high-density recording. If the thickness of the perpendicular magnetic recording layer is less than 3 nm, the reproduced output is too low and often lower than the noise component. If the thickness of the perpendicular magnetic recording layer exceeds 60 nm, the reproduced output is too high and often distorts the waveform.

In one embodiment of the present invention, the coercive force of the perpendicular magnetic recording layer is 237, 000 A/m (3,000 Oe) or more. If the coercive force is less than 237,000 A/m (3,000 Oe), the thermal decay resistance tends to decrease.

In one embodiment of the present invention, the perpendicular squareness ratio of the perpendicular magnetic recording layer is 0.8 or more. If the perpendicular squareness ratio is less than 0.8, the thermal decay resistance tends to decrease.

A protective layer can be formed on the perpendicular magnetic recording layer.

Figure 7:
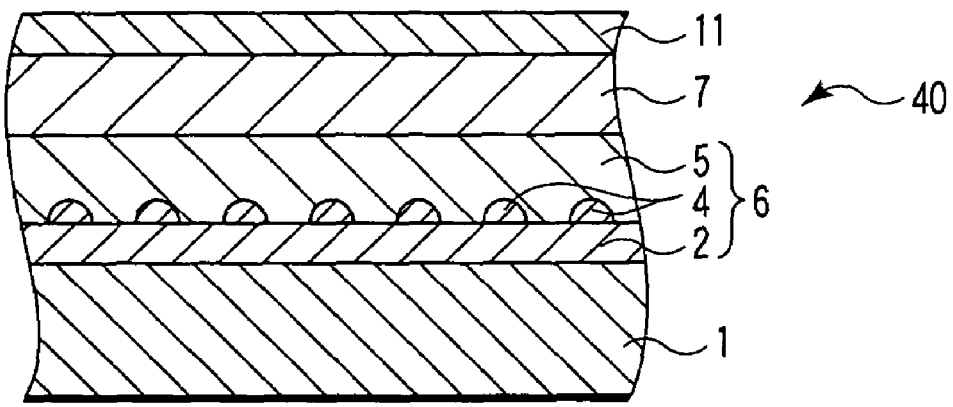
FIG. 7 is a schematic view showing the sectional structure of still another example of the perpendicular magnetic recording medium of the present invention.

FIG. 7 is a schematic view showing the sectional structure of still another example of the perpendicular magnetic recording medium of the present invention.

As shown in FIG. 7, a perpendicular magnetic recording medium 40 has the same structure as FIG. 1 except that a protective layer 11 is further formed on the magnetic recording layer 7. Note that in FIG. 7, the regions of the holes 3 are filled with the third metal underlayer. However, as shown in FIG. 5, the oxide 8 may also be formed on the first metal underlayer 2 in the regions of the holes 3. In addition, as shown in FIG. 6, the soft magnetic backing layer 9 may also be formed between the substrate 1 and multilayered underlayer 6.

The protective layer prevents corrosion of the perpendicular magnetic recording layer, and prevents damage to the medium surface when a magnetic head comes in contact with the medium. Examples of the material of the protective layer are those containing C, $SiO_2$, and $ZrO_2$.

In one embodiment of the present invention, the thickness of the protective layer is 1 to 10 nm. Since this decreases the distance between a head and the medium, the medium is suitable for high-density recording.

A lubricating layer (not shown) can also be formed on the protective layer.

As a lubricant used in the lubricating layer, it is possible to use conventionally known materials, e.g., perfluoropolyether, alcohol fluoride, or fluorinated carboxylic acid.

Figure 8:
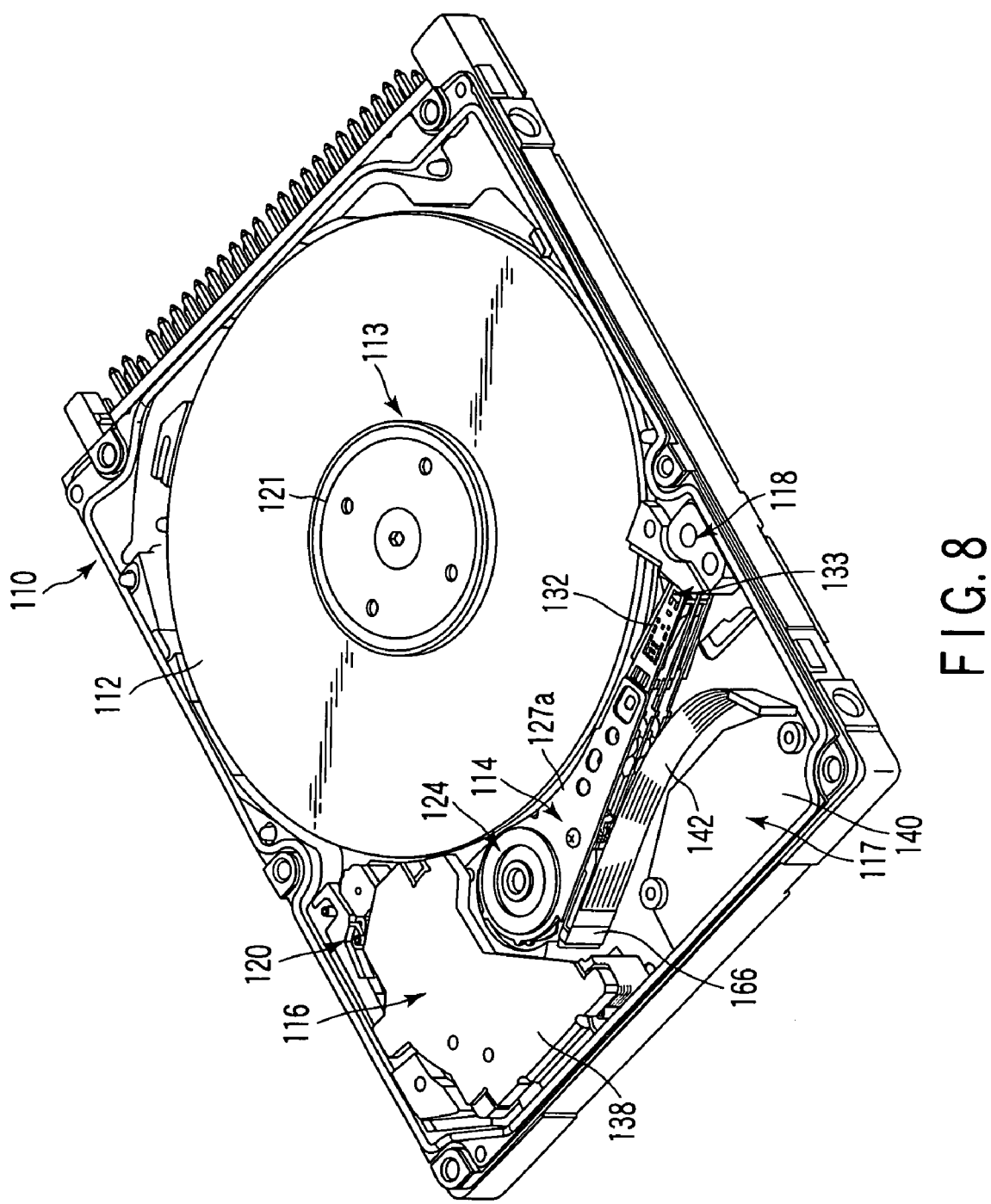
FIG. 8 is a partially exploded perspective view showing an example of a magnetic recording/reproducing apparatus according to the present invention.

FIG. 8 is a partially exploded perspective view showing an example of the magnetic recording/reproducing apparatus of the present invention.

As shown in FIG. 8, a hard disk drive (referred to as an HDD hereinafter) as a disk device has a rectangular boxy case 110 having an open upper end, and a top cover (not shown) which is screwed to the case by a plurality of screws to close the upper-end opening of the case.

The case 110 contains a magnetic disk 112 as a recording medium, a spindle motor 113 which supports and rotates the magnetic disk 112, a magnetic head 133 which records information on and reproduces information from the magnetic disk, a head actuator 114 which movably supports the magnetic head 133 with respect to the magnetic disk 112, a voice coil motor (referred to as a VCM hereinafter) 116 which rotates and positions the head actuator, a ramped loading mechanism 118 which holds the magnetic head 133 in a position separated from the magnetic disk when the magnetic head moves to the outermost periphery of the magnetic disk, an inertia latching mechanism 120 which holds the head actuator in a retracted position when an impact or the like acts on the HDD, and a flexible printed circuit board unit (referred to as an FPC unit hereinafter) 117 on which electronic parts such as a preamplifier are mounted.

A printed circuit board (not shown) which controls the operations of the spindle motor 113, VCM 116, and magnetic head via the FPC unit 117 is screwed to the outer surface of the case 110 so as to face the bottom wall of the case.

The magnetic disk 112 has a diameter of, e.g., 65 mm (2.5 in.), and has a magnetic recording layer. The magnetic disk 112 is fitted on a hub (not shown) of the spindle motor 113, and clamped by a clamp spring 121. The magnetic disk 112 is rotated at a predetermined speed by the spindle motor 113 as a driver.

The magnetic head 133 is a so-called combined head formed on a substantially rectangular slider (not shown). The magnetic head 133 has a write head having a single pole structure, a read head using a GMR film or TMR film, and an magnetoresistance (MR) head for recording and reproduction. The magnetic head 133 is fixed together with the slider to a gimbal unit formed on the distal end portion of a suspension 132.

The present invention will be described in more detail below by way of its experimental examples.

Experimental Embodiment 1

Manufacture of perpendicular magnetic recording medium

A disk-like cleaned glass substrate (manufactured by Ohara, outer diameter=2.5 in.) was prepared as a nonmagnetic substrate. This glass substrate was placed in a film formation chamber of a magnetron sputtering apparatus (C-3010 manufactured by Anelva), and the film formation chamber was evacuated until the base pressure of $2 \times 10^{-5}$ Pa or less. After that, sputtering was sequentially performed as follows in an Ar ambient at a gas pressure of 0.6 Pa.

First, a 100-nm thick CoZrNb alloy was formed as a soft magnetic layer on the nonmagnetic substrate.

Then, a multilayered underlayer including first, second, and third metal underlayers was formed as follows.

Next, a 5-nm thick Ti film was formed as the first metal underlayer.

Measurements were performed using an atomic force microscope (AFM) and X-ray diffractometer (XRD) in a case in which a Ti layer was stacked on a CrZrNb soft magnetic layer formed on the substrate and in a case in which a Ti layer was directly stacked on the substrate, thereby checking the microstructure and crystal orientation of each Ti underlayer. Consequently, it was found that the microstructure and crystal orientation of the Ti underlayer remained almost unchanged regardless of whether the CoZrNb soft magnetic layer was formed. That is, the CoZrNb soft magnetic layer was found to have large influence on the recording/reproduction characteristics using a head, but have substantially no influence on the medium structure above the Ti underlayer. Similar effects can be obtained by the medium described below even when no CoZrNb soft magnetic layer is formed.

Subsequently, a Cu layer having a thickness equivalent to an average layer thickness of 1 nm was formed as the second metal underlayer by sputtering, thereby forming a Cu layer having holes. The expression "equivalent to an average layer thickness of 1 nm" means that the sputtering amount was simply reduced to $\frac{1}{100}$ from the sputtering conditions under which it was possible to form a thin film having a substantially uniform thickness and a thickness of 100 nm was obtained by which the roughness on the surface presumably had no large influence on the measurement of the film thickness. This special expression is used because the Cu layer was not a layer having a uniform thickness but a discontinuous layer in which the Cu atoms or their clusters grew into islands and which had holes between these islands.

Note that Cu sputtering was performed on a target 90 mm in diameter at a DC input power of 40 W and a deposition rate of 0.2 nm/sec. An average layer thickness of 1 nm was obtained when sputtering was performed for 5 sec under the conditions.

The deposition was stopped after this Cu sputtering was performed, and the substrate was removed from the vacuum chamber to observe the surface condition with the AFM.

Figure 9:
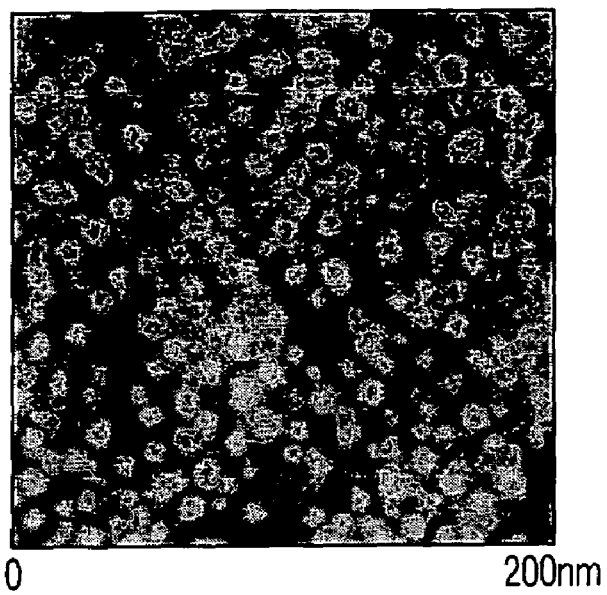
FIG. 9 is an AFM measurement image showing the surface condition of a second metal underlayer.

FIG. 9 is an AFM measurement image showing the surface condition of the second metal underlayer.

Referring to FIG. 9, each island-like whitish portion is the Cu grain, and a blackish portion is the Ti underlayer exposed from the holes between the Cu islands. As shown in FIG. 9, the obtained second metal underlayer was found to be a discontinuous layer having a plurality of holes and made of a plurality of Cu islands arranged at intervals corresponding to the holes. That the whitish portions were the Cu islands and the blackish portion was Ti was confirmed by additionally performing Transmission Electron Microscope (TEM) and Energy Dispersive X-ray analysis (EDX).

In FIG. 9, the average grain diameter of the Cu islands was estimated to be 10 nm or more. It was also found by cross sectional TEM lattice image observation that Cu epitaxially grew into (111) orientation by taking over (00.2) orientation of Ti.

It is readily possible to estimate that a similar structure is obtained even when the average layer thickness of Cu is equivalent to less than 1 nm. When the way of growth, the grain size, the density, and the like are taken into consideration, however, a similar structure is presumably obtained until the average layer thickness is equivalent to at least 5 nm. In one embodiment of the present invention, the average layer thickness of the second metal underlayer was 2 to 5 nm.

In this case, the 10-point average roughness Rz was 2.5 nm.

Then, on the Ti first metal underlayer on which the Cu layer having holes was formed, a layer of Ru which forms no solid solution with Cu and forms an alloy or intermetallic compound with Ti depending on the composition was stacked as the third metal underlayer. The initial stage of the formation of this Ru layer was observed with the AFM.

First, to improve the visibility of AFM observation, a Cu layer having a thickness equivalent to an average layer thickness of 2 nm was sputtered on the Ti underlayer.

Figure 10:
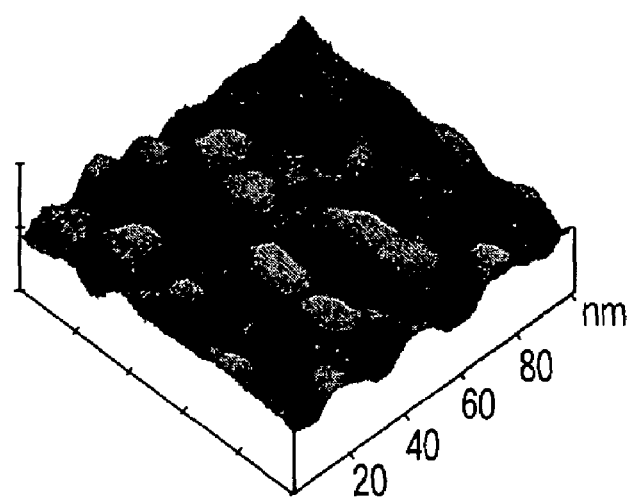
FIG. 10 is a view which three-dimensionally plots the surface condition of the second metal underlayer.

FIG. 10 is a view which three-dimensionally plots the measurement result indicating the surface condition of the second metal underlayer thus obtained. Referring to FIG. 10, as in FIG. 9, each island-like whitish portion is the Cu island, and a blackish portion is the Ti underlayer exposed from the holes between the Cu islands. As shown in FIG. 10, although the diameters of the Cu islands were larger than those in the second metal underlayer shown in FIG. 9, the structure was basically the same in that a discontinuous layer having a plurality of holes and made of a plurality of Cu islands arranged at intervals corresponding to the sizes of the holes was obtained.

Note that if the average layer thickness increases, the grain diameters of the Cu islands increase, and adjacent islands partially connect to each other in some portions. Since it is difficult to directly observe this partial island connection, a layer thickness at which the connection starts is difficult to specify. However, even when a partially connected portion exists, the layer is regarded as a discontinuous layer as long as the metal grains form an island-like structure.

Cu was sputtered under various conditions in addition to the above condition, and cases in which island-like Cu grains were formed were checked. The 10-point average roughness Rz of a Cu layer in which island-like Cu grains were formed was about twice the average layer thickness in one embodiment of the present invention, and was 1.5 to 3 times the average layer thickness in some embodiment of the present invention.

The division of the ordinate in FIG. 10 is 8 nm. The 10-point average roughness Rz was about 5 nm. Since the average layer thickness of Cu was equivalent to 2 nm, the 10-point average roughness Rz was about 2.5 times the average layer thickness.

In addition, when a Cu layer was formed on the Ti underlayer by increasing the average layer thickness to be equivalent to 10 nm, no such clear island-like structure as shown in FIG. 10 was observed, and the surface roughness was obviously small. The intervals between the Cu islands in FIG. 9 (average layer thickness=1 nm) are about 20 nm. Since, however, the Cu islands grow in the in-plane direction of the film as the average layer thickness increases, portions where the Ti underlayer is exposed are perhaps substantially eliminated when the average layer thickness is half the grain interval. Note that it is generally difficult to grow grains such that the height is larger than the diameter. Therefore, when the average layer thickness is larger than the grain interval, a continuous film having no hole presumably forms.

No effect of forming the fine Ru grains was obtained when the average layer thickness of Cu was increased to be equivalent to 10 nm and an Ru interlayer was formed on the layer. The surfaces after the Cu layer and Ru layer were formed were observed with the AFM. As a consequence, although the roughness on each surface were originally small because the valleys between the Cu grains were filled, on the Ru surface the roughness of the Ru grains were overlaid on those of the Cu surface. This is probably because if no Ti layer is exposed between the Cu grains, Ru does not grow to fill the valleys between the Cu grains.

On the Cu layer sputtered to have an average layer thickness equivalent to 2 nm, a layer of Ru having an average layer thickness equivalent to 2 nm was sputtered as the third metal underlayer.

Figure 11:
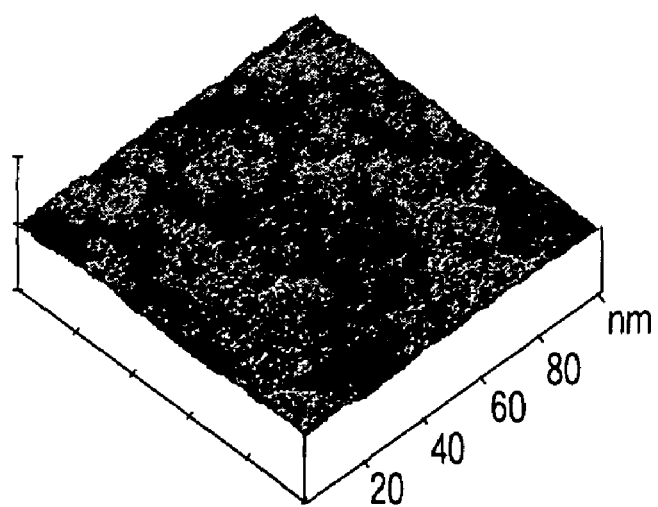
FIG. 11 shows the surface structure in the initial stage of a third metal underlayer.

FIG. 11 shows the surface structure in the initial stage of the third metal underlayer.

As shown in FIG. 11, the surface roughness was evidently smaller and flattener than that shown in FIG. 10. It is difficult to presume that this roughness was flattened because the Cu grains and Ru were mixed and reconstructed on the surface. It is rather possible to estimate that the surface was flattened because the third metal Ru which hardly forms a solid solution with the second metal Cu and relatively easily forms a solid solution with the first metal Ti was selected, so Ru was preferentially deposited in the hole regions where the Ti underlayer was exposed, and buried the holes between the Cu islands. Small roughness on the surface shown in FIG. 11 are nuclei or crystal grains of Ru, and well correspond to the growth and structure of Ru to be explained later. Note that in FIGS. 10 and 11, some nuclei of Ru presumably grew on the Cu grains as well when the sizes of Ru and Cu grains are taken into consideration. However, this structure is obviously not a model in which Ru grains grow preferentially on Cu nuclei in one-to-one correspondence with each other.

On the Ru layer sputtered until the average layer thickness was equivalent to 2 nm, sputtering was subsequently performed to a thickness of 20 nm to form a final third metal underlayer.

The effect of decreasing the grain size was obtained even when the Ru layer was formed with the Ar gas pressure being kept at 0.6 Pa as described above. In this experimental example, however, after a 10-nm thick Ru layer was formed at a low Ar gas pressure of 0.6 Pa, the Ar gas pressure was raised to 6 Pa to further form a 10-nm thick layer.

Separately, plane view TEM analysis was performed on an Ru layer formed at a uniformly high Ar gas pressure. Consequently, it was possible to form the fine crystal grains, and effectively suppress grain size dispersion. In addition, probably amorphous grain boundary which looked like white gaps were observed between the crystal grains, so the effect of promoting disconnection of recording layer grains to be formed on the Ru layer was expected. On the other hand, the crystal orientation worsened. In one embodiment of the present invention, therefore, in order to improve the crystal orientation, the low gas pressure and high gas pressure were used in the first and second halves, respectively, of the film formation, thereby obtaining totally favorable recording/reproduction characteristics. Note that the same effect can be expected as long as the gas pressure in the second half is relatively higher than that in the first half, and this gas pressure in the second half may also be 10 Pa or more. Note also that the layer thickness was 10 nm in each of the first and second halves of this experimental example, but the similar effect can be obtained regardless of the layer thickness ratio.

To check the grain size of the Ru layer, the substrate was taken out from the vacuum chamber when the formation of the Ru layer was completed, and plane view TEM observation was performed.

When compared to an Ru layer formed in the same manner as above except that no Cu layer having holes was sputtered, the grain size greatly decreased. When the grain sizes of the Ru crystal grains were analyzed, the average diameter was about 9 nm when no Cu layer having holes was formed, but was about 6 nm when this Cu layer was formed. In the Ru interlayer of the conventional underlayer, forming of the fine crystal grains was limited to a grain diameter of about 8 nm even when the underlayer materials were optimized. Accordingly, the effect of decreasing the grain size by the discontinuous second metal underlayer made of Cu is very large.

Also, to check the growth of crystal grains in the film thickness direction, cross-sectional TEM observation was performed after a magnetic recording layer was formed.

Figure 12:
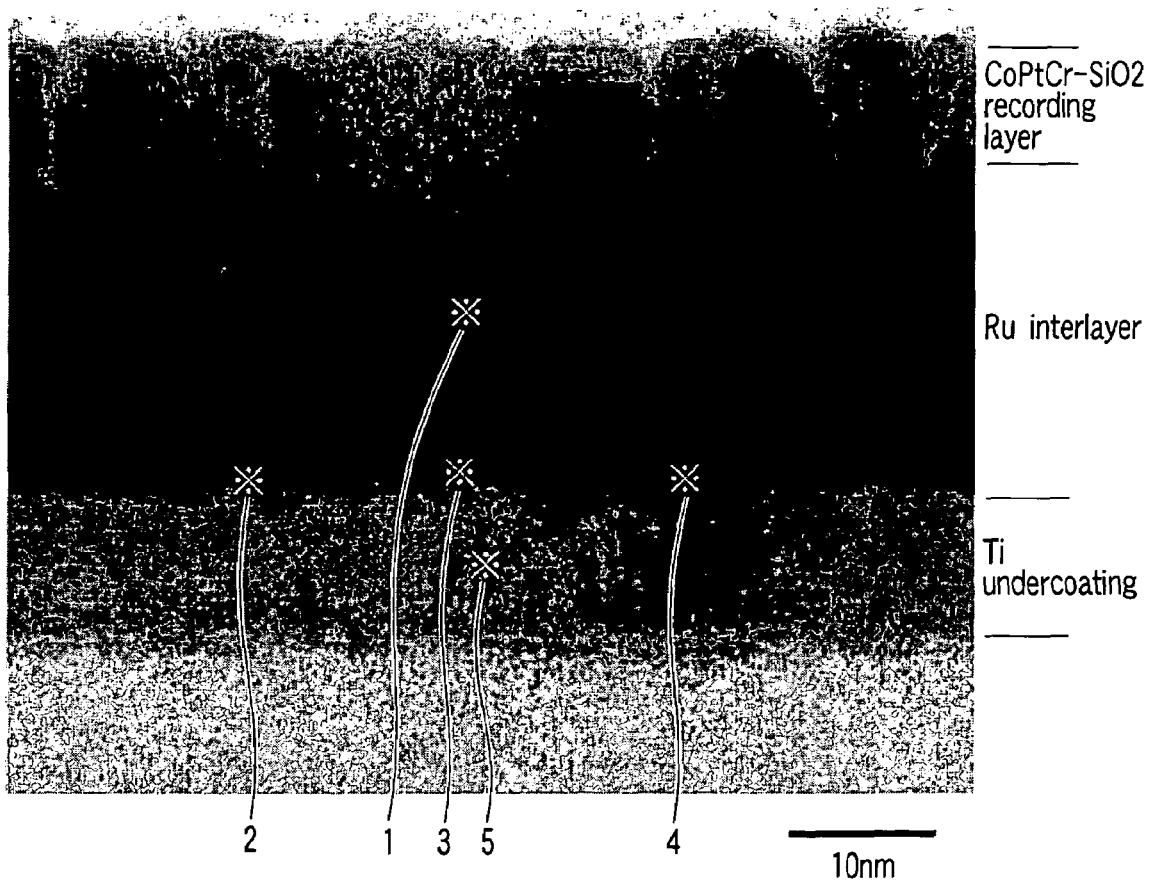
FIG. 12 is a cross-sectional TEM image of an example of a perpendicular magnetic recording medium according to the present invention.

FIG. 12 shows a cross-sectional TEM image of an example of the perpendicular magnetic recording medium according to the present invention.

As shown in FIG. 12, Ru crystal grains grew into columns while the grain size was substantially constant throughout the entire thickness of the Ru layer. In addition, several experiments were conducted by changing the material of the first metal underlayer without the second metal underlayer. Consequently, it was found that the Ru layer did not largely depend on the material of the first metal underlayer, and often grew into columns while a predetermined grain diameter smaller than 20 nm was held. A model to be explained below demonstrates that the effect of decreasing interlayer grain size by Cu islands is obtained even when an interlayer does not grow with a predetermined grain diameter. However, the characteristic that Ru grains are hardly enlarged in the film longitudinal direction with increasing the layer thickness is suitable for the material of an interlayer.

In this cross-sectional TEM image shown in FIG. 12, a Cu layer having a very small average layer thickness, which was supposed to exist in the boundary between the Ti layer and Ru layer, was not clearly observed, and an Ru interlayer was apparently substantially grown on the Ti underlayer. Since it was difficult to directly observe Cu in respect of contrast as well, composition analysis was performed using EDX. Marks * shown in FIG. 12 indicate the measurement points. The largest amounts of Cu were detected near the boundary (Nos. 2, 3, and 4) between the Ti underlayer and Ru interlayer, and almost no Cu was detected in the Ti underlayer (No. 5) separated from the boundary and in a middle portion (No. 1) of the Ru interlayer. These results probably show that Cu does not form a layered structure not because of diffusion or solid solution, but forms a discontinuous island-like structure as described above, and Ru grows on Ti so as to fill the gaps between these islands.

Also, the crystal orientation of the Ru layer was evaluated by XRD. Consequently, the same high degree of orientation as when no Cu layer having holes was formed was obtained even when a Cu layer having holes was formed. It is evident that the Ru layer was formed not only on the Ti layer but also on the Cu layer, from the fact that the Ru grains have a smaller grain size and a higher density than those of the Cu grains, in addition to the results of the structural analysis described above. Additionally, it is easy to imagine that if the crystallinity of the Cu layer is low or is not (111) orientation, the degree of crystal orientation of the Ru layer on this Cu layer worsens. Accordingly, although it is difficult to observe the peak of Cu itself by XRD because the Cu amount was small, the result that the crystallinity of the Ru layer was high and the crystal orientation was (00.2) orientation represents that the Cu layer had (111) orientation and high crystallinity, and the Ru crystal grains epitaxially grew on the Cu layer. In other words, the crystal structure and crystallinity of the Cu layer play important roles. In one embodiment of the present invention, if the crystal structure of the interlayer is a close packed structure such as hcp or fcc, the crystal structure of the metal layer formed before that is also a close packed structure. In some embodiment of the present invention, the crystallinity is also high.

The relationship between the Cu layer formed on the Ti layer and having holes and the fine crystal grains of the Ru layer grown on the Cu layer will be explained below by using a simple model.

Figure 13:
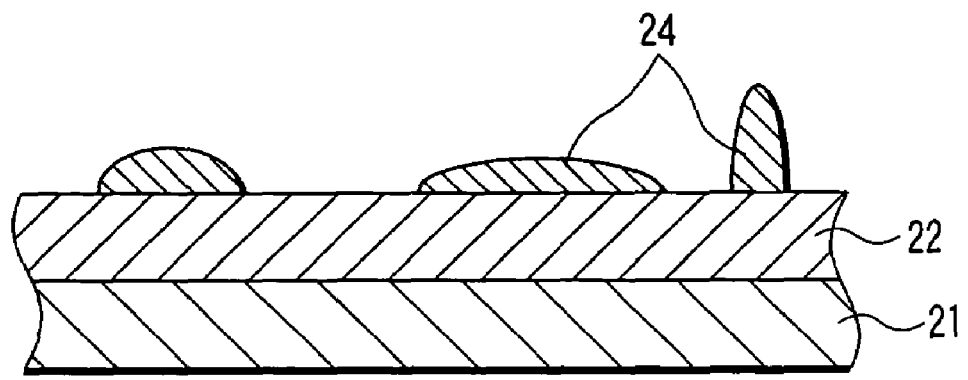
FIG. 13 is a model view showing an example of the way third metal grains deposit on a second metal underlayer.
Figure 14:
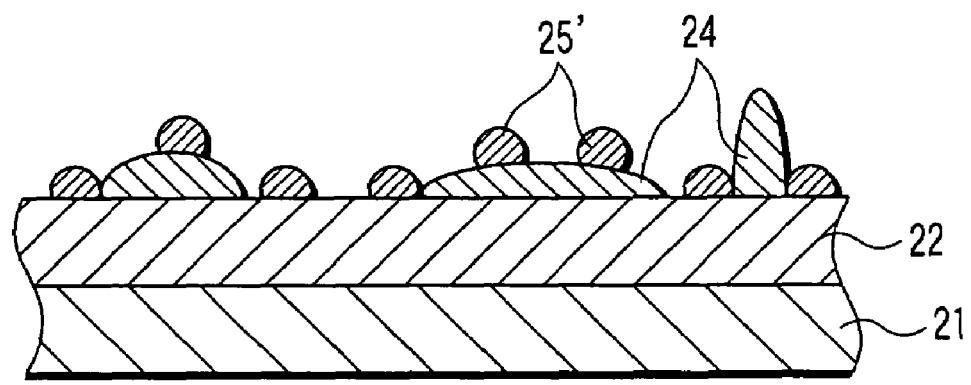
FIG. 14 is a model view showing the example of the way the third metal grains deposit on the second metal underlayer.
Figure 15:
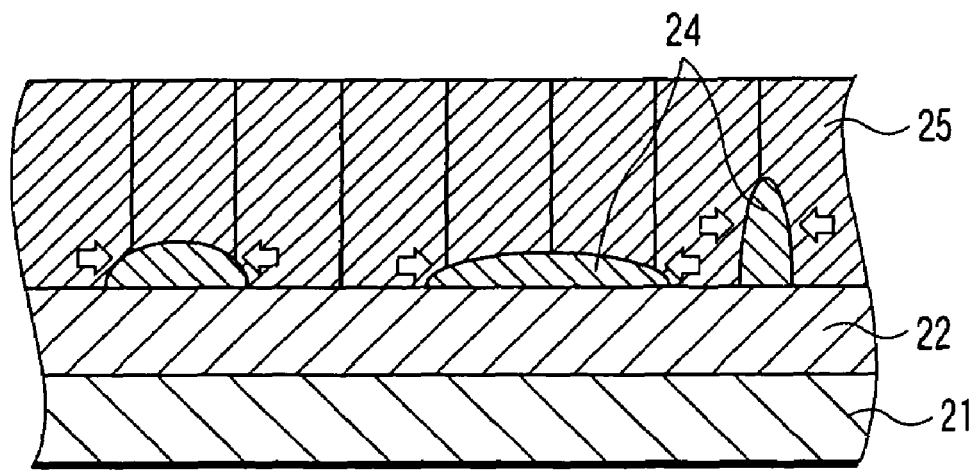
FIG. 15 is a model view showing the example of the way the third metal grains deposit on the second metal underlayer.

FIGS. 13 to 15 are model views showing an example of the way the grains of the third metal deposit on the second metal underlayer.

FIG. 13 assumes a case in which a Cu layer 24 made of a plurality of Cu islands having, e.g., a horizontally extended shape and vertically extended shape is formed on a relatively flat Ti layer 22 formed on a substrate 21.

FIG. 14 shows the way Ru metal grains 25' deposit on the Ti layer 22 and Cu layer 24 in the initial stage of Ru layer formation. Since Ru is selected as a material having affinity higher for Ti than for Cu, Ru grains 25' do not selectively form on, e.g., vertically long Cu islands. The Ru grains 25' deposited on horizontally long Cu islands stay on them if they cannot well move to the Ti layer although they are stabler on the Ti layer.

FIG. 15 shows the state in which the formation of the Ru layer is further continued and Ru grows into columns on the basis of holes in the Cu layer 24. FIG. 15 demonstrates that the effect of suppressing enlargement in the film longitudinal direction of the Ru grains in portions indicated by the arrows at the end portions of the Cu islands can be expected. When Ru is thus grown, Ru grains grown on the Cu islands and those grown on the Ti underlayer are in contact with each other. However, a grain boundary readily forms between these Ru grains since they are different in lattice strain and interface diffusion, so the effect of preventing the Ru grains from connecting to each other to form large grains can also be expected. On the other hand, two Ru grains can grow without connecting to each other on the horizontally long Cu island in the center. This is so because Ru is a material which can easily grow into columns while a predetermined grain diameter is held. The growth in the in-plane direction of these Ru grains also stops when they come in contact with the Ru grains which have grown on the Ti layer and prevented from enlarging. Therefore, the grain diameter can be made smaller than those of naturally formed grains. As described above, in one embodiment of the present invention, Ru is presumably suitable as the third metal underlayer.

Furthermore, a 10-nm-thick perpendicular magnetic recording layer was formed on the third metal underlayer by sputtering a (Co-16 at % Pt-10 at % Cr)-10 mol % $SiO_2$ composite target.

Subsequently, a 3-nm-thick C protective layer was stacked by using CVD.

After the film formation was performed to this point, the layers below the interlayer were removed by ion milling or the like, and plane view TEM observation was performed.

Consequently, the perpendicular recording layer had a segregated structure in which crystalline magnetic crystal grains were separated by a nearly amorphous grain boundary. It was possible to estimate that the average grain diameter was about 5 nm, and the average grain boundary thickness was about 1 nm.

Even when a target containing 8 mol % of $SiO_2$ was used, the average grain diameter slightly increased but did not great change. In this case, however, the thickness of the grain boundary decreased, and the crystal grains were partially in contact with each other. That is, magnetic separation between the individual magnetic crystal grains which grew into columns was likely to worsen in the structure. Since the slope of a magnetization curve can be used as an index of separation between magnetic crystal grains in a perpendicular magnetic recording medium, the magnetic characteristics were evaluated by using a vibrating sample magnetometer (VSM). As a consequence, the magnetic coupling between the magnetic crystal grains was obviously stronger in an 8-mol % sample than in a 10-mol % sample, and this probably increased the medium noise.

Also, when the addition amount of $SiO_2$ was changed from 8 to 10 mol %, the magnetic separation between the magnetic crystal grains which grew into columns was obviously improved by the thick grain boundary. To encourage this effect, therefore, the amount of $SiO_2$ can be further increased. In this case, the effect of further decreasing the grain size of the magnetic crystal grains can also be expected.

In addition, cross-sectional TEM observation was performed on the obtained perpendicular magnetic recording medium. Consequently, in the perpendicular magnetic recording layer, similar to FIG. 12, the magnetic crystal grains grew from the interlayer into the form of columns on the Ru grains in one-to-one correspondence with each other. A lattice image showed that the close packed (crystal) surface of the recording layer epitaxially grew parallel to the closed packed surface of the interlayer. This crystal structure did not unexpectedly change even when the grain size decreased. In one embodiment of the present invention, when a CoPtCr-based oxide granular recording layer having the hcp structure is formed on an Ru interlayer having the hcp structure, the characteristics as a perpendicular medium, e.g., the crystallinity, segregated structure, coercive force, and medium noise show an overall improvement. Accordingly, this is a favorable combination.

Since the Ru grains and magnetic crystal grains have a one-to-one correspondence, forming of the fine Ru grains can accelerate forming of the fine magnetic crystal grains as well. Also, when the volume ratio of the crystal grains to the amorphous grain boundary in the recording layer is constant, the thickness of the grain boundary decreases if the grain size decreases. In effect, a composition of 8 mol % previously used as comparison is an appropriate value when the grain diameter in the Ru interlayer is 8 nm or more. It can be predicted even with this simple reason that if the grain diameter decreases to 6 nm while the composition is fixed, the thickness of the grain boundary decreases, and the interaction increases. To keep the magnetic balance, therefore, as the grain diameter of the underlayer decreases, it is desirable to raise the volume ratio of the amorphous grain boundary by increasing the oxide composition in the recording layer.

After the layers up to the protective layer were stacked as described above, the substrate was removed from the film formation chamber, and a 1.3-nm-thick perfluoropolyether lubricating layer was formed on the protective layer by dipping, thereby obtaining a perpendicular magnetic recording medium. The obtained perpendicular magnetic recording medium had the same structure as FIG. 6 except that the lubricating layer is not shown.

The recording/reproduction characteristics were evaluated by using a read-write analyzer (1632 manufactured by Guzik of the U.S.A.) and a spinstand (S1701MP). Also, information was recorded and reproduced by using a combined head for perpendicular recording which includes a single pole recording element made of CoFeNi, and a giant magnetoresistance effect (GMR) reproducing element with an intershield distance of 90 nm. Note that as the material of the recording magnetic pole, materials such as CoFe, CoFeN, NbFeNi, FeTaZr, and FeTaN may also be used. It is also possible to add additive elements to these magnetic materials as main components.

When the reproduced signal output/medium noise ratio of the obtained perpendicular magnetic recording medium was measured, a high value of 22.8 dB was obtained.

The reproduced signal output/medium noise ratio is the root-mean-square value of noise when recording is performed at an amplitude/linear recording density of about 800 kFCl at a linear recording density of about 100 kFCl, and will be referred to as SNRm hereinafter.

On the other hand, when the reproduced signal output/medium noise ratio of a perpendicular magnetic recording medium having no Cu layer was measured, the SNRm was 17.2 dB.

From the foregoing, the formation of the Cu layer had a very large effect of reducing the medium noise.

Experimental Embodiment 2

Perpendicular magnetic recording media were manufactured following the same procedures as in Experimental Embodiment 1 except that Ni, Rh, Pd, Pt, Ag, and Au having the same fcc as Cu were used as the second metal underlayer instead of Cu.

As in Experimental Embodiment 1, to check the growth of metal crystal grains, the film formation was stopped when these second metal materials were sputtered, and AFM measurements were performed.

The surface roughness increased when the sputtering amount of the second metal underlayer was increased or decreased, where necessary, within the range equivalent to an average layer thickness of about 0.5 to 2 nm. Therefore, it is presumably possible, depending on the film formation conditions, to form metal grains into islands and obtain a second metal underlayer having holes, regardless of the metal material used as the second metal underlayer.

Then, to check the grain size of Ru, plane view TEM observation was performed on the state obtained by stopping the formation of the third metal underlayer.

Consequently, the effect of decreasing the grain size of the Ru layer was found for Ag and Au, when compared to cases in which they were not sputtered. However, no fine grain effect was found for Ni, Rh, Pd, and Pt.

In addition, layers up to a lubricating layer were formed, and the recording/reproduction characteristics were evaluated. As a result, the effect of increasing the SNRm was obtained for Ag and Au, when compared to a case in which no second metal underlayer was formed. However, no effect of reducing the medium noise was found for Ni, Rh, Pd, and Pt.

Furthermore, the effects of decreasing the grain size and reducing the medium noise were found when metal grains were formed by mixing Cu, Ag, and Au as the second metal underlayer, compared to a case in which no second metal underlayer was formed.

Ni, Rh, Pd, and Pt used as the second metal underlayer form a substantially complete solid solution with Ru used as the third metal underlayer. Accordingly, the crystal grains were effectively made fine by the stopper from the third metal underlayer to the magnetic recording layer probably because the metal grains in the second metal underlayer form a discontinuous island-like structure on the first metal underlayer, and the third metal underlayer formed on the second metal underlayer had no solid solution properties with respect to the metal grains in the second metal underlayer. Therefore, in one embodiment of the present invention, since the close packed structure is particularly suited for the Ru layer in order to obtain a high degree of crystal orientation in the perpendicular magnetic recording medium, Cu, Ag, and Au having the close packed structure are preferable, and Cu by which the most favorable characteristics were obtained is more preferable as the metal material used in the second metal underlayer.

Experimental Embodiment 3

Perpendicular magnetic recording media were manufactured following the same procedures as in Experimental Embodiment 1 except that Ni, Rh, Pd, Pt, Ag, Au, Nb, and Ta were used as the first metal underlayer instead of Ti.

As in Experimental Embodiment 1, to check the growth of metal grains, the film formation was stopped when Cu was sputtered on the first metal underlayer, and AFM measurements were performed.

The surface roughness increased when the sputtering amount of Cu was increased or decreased, where necessary, within the range equivalent to an average layer thickness of about 0.5 to 2 nm.

Since the sputtering amount was small, therefore, it is presumably possible, depending on the film formation conditions, to form metal grains into islands and obtain a second metal underlayer having holes on the first metal underlayer, regardless of the metal material.

Then, to check the grain size of Ru, plane view TEM observation was performed on the state obtained by stopping the formation of the Ru layer. Consequently, the effect of forming the fine grain of the Ru layer (by forming Cu islands) was found when Ni, Pd, Pt, Nb, and Ta were used as the first metal underlayer, but no fine grain effect was found for Rh, Ag, and Au.

In addition, layers up to a lubricating layer were formed, and the recording/reproduction characteristics were evaluated. As a result, the effect of increasing the SNRm (by forming Cu islands) was obtained for Ni, Pd, and Pt, but no medium noise reducing effect was found for Rh, Ag, Au, Nb, and Ta.

Furthermore, the effects of decreasing the grain size and reducing the medium noise by forming Cu islands as the second metal underlayer were found when the first metal underlayer was formed by mixing Ti, Ni, Pd, and Pt. Even when the first metal underlayer was formed by adding Nb and Ta to these main components, the effects of decreasing the grain size and reducing the medium noise by forming Cu islands were obtained.

For Nb and Ta, the fine grain effect was found, but no SNRm increasing effect was obtained. This is perhaps mainly caused by the crystal structures of Nb and Ta. Of the first metal underlayer materials, Nb and Ta alone had the bcc structure. Therefore, even when the Ru layer as the third metal underlayer was directly stacked without forming any Cu layer as the second metal underlayer, the crystal orientation of the Ru layer was inferior to those of the other first metal underlayer materials. However, Ru had (00.2) orientation. This is so because especially when the film thickness is small, Nb and Ta readily form fine crystals and have no great influence on the crystal orientation of Ru. If a thick Nb or Ta layer is stacked and the original (110) orientation strongly appears, Ru probably has orientation except for (00.2). Also, when Cu is sputtered on the Nb or Ta underlayer, the island-like structure can be rather clearly observed and the first metal underlayer is readily kept exposed, because both Nb and Ta have no solid solution properties with respect to Cu. However, even when Ru was formed on the surface like this, the crystal orientation did not particularly improve, and only Ru (00.2) orientation weaker than the other fcc (close packed structure) was obtained. In the magnetic recording medium according to the present invention, the crystal orientation and SNRm have a correlation. When Nb or Ta is used as the first metal underlayer, therefore, the SNRm increasing effect by forming fine grains is obtained, but a low crystal orientation presumably cancels this increase by fine grains.

As described above, in one embodiment of the present invention, a metal having a close packed structure is suitable for the first metal underlayer material used in the present invention.

Then, the underlayers having the same close packed structure were compared in relation to forming the fine Ru grains. As a result, the effect was obtained by Ni, Pd, and Pt, but no effect was found for Ag and Au. When this is considered on the basis of the above-mentioned model which forms the fine grain of the interlayer with islands, in order to obtain the effect of the stopper, it is presumably necessary that Ru preferentially grow on the underlayer rather than on the islands, i.e., Ru have affinity higher for the underlayer than for the islands. One criterion of the affinity is the ease with which an alloy forms. However, while Ni, Pd, and Pt form substantially complete solid solutions with Ru, Ag and Au hardly form any complete solid solutions with Ru. When Ru is formed, the former has a large difference in affinity between the underlayer and islands, but the latter has a small difference and does not allow easy selective growth. This probably leads to the presence/absence of the fine grain effect.

Note that Ti forms no complete solid solution with Ru but forms an alloy depending on the composition, so Ti has affinity higher for Ru than for Cu. From the above consideration, in one embodiment of the present invention, it is presumably favorable for making fine that the second metal underlayer forms no solid solution with the third metal underlayer, and the first metal underlayer forms a solid solution with the third metal underlayer.

Also, in one embodiment of the present invention, Pd or Pt is better than Ti in respect of high affinity for Ru, but Ti is suitable as a whole in view of the effect of increasing the SNRm. Possible main causes are the contributions of the size of the island-like structure formed by the Cu islands and the grain size of the first metal underlayer itself.

Experimental Embodiment 4

Perpendicular magnetic recording media were manufactured following the same procedures as in Experimental Embodiment 1 except that when the second metal underlayer was sputtered, not only Cu as the metal grain material but also TiO, $TiO_2$, $SiO_2$, and $Cr_2O_3$ were simultaneously sputtered.

As the simultaneous sputtering method, co-sputtering by which independent targets were simultaneously discharged and composite targets in which Cu and oxides were mixed were used. However, some other method may also be used. Note that in one embodiment of the present invention, TiO is suitable because it is conductive and can be discharged with DC during co-sputtering. In some embodiment of the present invention, even when a composite target is used, no abnormal discharge readily occurs, and particles are not easily produced, when compared to a case in which $SiO_2$ as an insulator or the like is mixed.

As in Experimental Embodiment 1, to check the growth of metal grains, the film formation was stopped when Cu and the oxide described above were simultaneously sputtered on the first metal underlayer, and AFM measurements were performed. Even when the oxide was added, an island-like structure was clearly observed, and the sizes of the islands were decreased by increasing the composition of the oxide. When TiO was used, for example, it was possible to decrease the grain diameter to about 7 to 8 nm by adding 40 to 50 vol %.

Then, to check the grain size of Ru, plane view TEM observation was performed on the state obtained by stopping the formation of the third metal underlayer. Consequently, the effect of decreasing the grain size of the Ru layer was larger when the oxide was added to Cu than when Cu alone was used. For example, the average grain diameter was about 5 nm when 40 to 50 vol % of TiO was added.

As described previously, when the grain size of the Ru layer decreases, the balance of the microstructure of the magnetic recording layer also changes. Therefore, the composition of the magnetic recording layer was optimized.

Furthermore, layers up to a lubricating layer were formed, and the recording/reproduction characteristics were evaluated. As a result, the effect of increasing the SNRm was larger when the oxide was added to Cu than when Cu alone was used. For example, the SNRm was as very high as 24.5 dB when 40 to 50 vol % of TiO was added.

In addition, even when sputtering was performed by mixing TiO, $TiO_2$, SiO, and $Cr_2O_3$ as oxides, the effects of decreasing the grain size and reducing the medium noise (by adding the oxides) were found.

For Cu to which the oxide was added, the sputtering amount was increased or decreased in order to promote fine grain and increase the SNRm. Consequently, even when the addition amount was 50 vol % for, e.g., an average layer thickness equivalent to 2 nm, the ratio of the oxide was equivalent to 1 nm. A small amount like this is generally difficult to detect. To check the way the oxide functioned, therefore, analysis was performed in the direction of depth by using SIMS. As a result, the oxide existed near the boundary between the Ti underlayer and Ru interlayer as in the case of Cu, although the position was difficult to locate.

Also, XRD measurement was performed on a 20-nm thick film formed by simultaneously stacking Cu and TiO by sputtering. As a result, the peak position did not shift, and the same result as when only Cu was used was obtained. From the foregoing, Cu is presumably phase-separated from TiO without combining with Ti or oxidizing. When the analytical results of the $CoPtCr—SiO_2$ recording layer are also taken into consideration, no oxide necessarily exists in the film at a stoichiometric ratio. Generally, however, a granular structure in which an amorphous grain boundary surrounds crystalline grains can be formed by adding an oxide, and the effect of decreasing the grain size of the crystalline grains can be expected.

Furthermore, when the AFM measurement was performed after the Cu film formation, it was possible to observe distinct islands as in the case where no oxide was basically added (although the fine grain effect was obtained). When this is also taken into account, the oxide probably exists on the Ti underlayer exposed between the Cu islands, i.e., in the holes of the second metal underlayer made of Cu.

Since the degree of crystal orientation did not particularly worsen on XRD, the degree of crystal orientation of the Ru layer which grew on the Ti layer did not worsen even in the presence of the oxide. In effect, TiO having a thickness equivalent to an average layer thickness of about 0.5 nm, i.e., having a thickness on the order of about twice the size of an atom does not exist as a thin film in a compound state at a stoichiometric ratio of 1:1, and particularly O perhaps slightly diffuses in the Ti layer or Ru layer. In this state, the Ru layer can be substantially regarded as having grown on the Ti layer, and the oxide does not degrade the leyree of crystal orientation of the third metal underlayer. It is rather possible to expect the effect of forming the fine third metal underlayer grains.

Separately, AFM measurement was performed by forming a Cu—TiO layer having a large thickness equivalent to an average layer thickness of 10 nm. As a result, although the diameters of the Cu islands increased, the Cu islands had a shape close to a circle and clearly separated from each other, and the surface had a three-dimensional structure with a 10-point surface roughness Rz of 10 nm. When an Ru interlayer was formed on this layer, no such three-dimensional structure as formed when the average layer thickness of Cu alone was equivalent to 10 nm were found, and the Ru surface was flattened to a state in which only the three-dimensional structure of Ru grains of about 3 nm remained. Ti in TiO of the matrix presumably helped fill the three-dimensional structure on the Cu—TiO surface. However, unlike when the Ti underlayer was exposed, no fine Ru grain forming effect was found. From this result, in one embodiment of the present invention, a metal serving as a base of the oxide for use in the granular matrix can be selected from the same material as the underlayer or a material having high affinity for Ru. However, if the surfaces of the oxide and underlayer are covered with a thick layer, forming of the fine Ru grains is probably disturbed.

As described above, when an oxide layer is formed simultaneously with the formation of the second metal underlayer, and, in one embodiment of the present invention, when an oxide layer is further formed in the holes of the second metal underlayer, it is possible to form the fine crystal grains in the third metal underlayer and form the fine crystal grain in the magnetic recording layer formed on the third metal underlayer.

Note that when the metal grains in the second metal underlayer are made fine to shorten the inter-grain distance, a fine grain model of the third metal underlayer grown on the surface of the first metal underlayer on which the metal grains are formed can be made simpler than the model views shown in FIGS. 13 to 15.

FIGS. 16 to 18 are model views showing another example of the way the grains of the third metal deposit on the second metal underlayer.

FIG. 16 shows the state in which fine metal grains 24' forming the second metal underlayer are formed on a first metal underlayer 22. As shown in FIG. 16, if the sputtering amount remains the same, the smaller the grain size, the higher the grain density, and the narrower the grain spacing. FIG. 17 shows the state in which third metal grains 25' start forming on the fine second metal grains 24'. Since the third metal grains 25' basically hardly grow right on the metal grains 24' and the metal grains 24' are small, all the third metal grains 25' perhaps selectively grow on the first metal underlayer 22 exposed between the metal grains 24' of the second metal underlayer. From this state, the metal grains 24' of the second metal underlayer presumably function as stoppers against enlargement in the in-plane direction of the metal grains 25', so the fine grains of the third metal underlayer grow into columns as shown in FIG. 18.

In the structure as shown in FIG. 17, the third metal grains 25' do not easily grow on the second metal grains 24'. Therefore, forming of the fine third metal grains 25' is independent of the crystal structure and crystal orientation of the second metal grains 24'. Also, the spacings between the second metal grains 24' are narrow, and this prevents the formation of nuclei of a plurality of third metal grains 25'. Accordingly, a fine third metal underlayer can be obtained without using, as the third metal grains 25', a material such as Ru by which the grain size readily decreases.

Experimental Embodiment 5

Magnetic recording/reproducing apparatuses were manufactured by combining the perpendicular magnetic recording media of Experimental Embodiments 1 to 4 with the same head as used in the spinstand evaluation.

Recording/reproducing operations were performed to evaluate the bit error rate (bER). As a result, an increase in bER corresponding to the increase in SNRm described above was obtained. When the evaluation was performed on a ring type head for longitudinal magnetic recording, the bER was lower than that of the perpendicular magnetic recording head. This is probably because the recording capability lowered owing to the difference between the shapes of the recording elements, and the SNRm and recording resolution lowered. That is, the perpendicular magnetic recording head was more favorable than the longitudinal magnetic recording head.

The effectiveness of the present invention in the magnetic recording/reproducing apparatus is explained in this specification. However, when the properties of the magnetic recording medium on which the present invention has its effect are taken into account, the present invention can achieve its effect not only on a magnetic disk apparatus but also on general magnetic recording/reproducing apparatuses using the perpendicular magnetic recording method, regardless of whether a tape medium, drum medium, or the like is used, i.e., independently of the shape of the magnetic recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
    a substrate;
    a multilayered underlayer including a first metal underlayer formed on the substrate, a second metal underlayer formed on the first metal underlayer and having a hole, and a third metal underlayer consisting of ruthenium, formed on the second metal underlayer and directly on the first metal underlayer in the hole, having solid solution properties with respect to the first metal underlayer, and having no solid solution properties with respect to the second metal underlayer; and
    a magnetic recording layer formed on the multilayered underlayer.

2. The medium according to claim 1, wherein the second metal underlayer has one of a hexagonal close packed structure and a face-centered cubic lattice structure.

3. The medium according to claim 1, wherein an average crystal grain diameter of the ruthenium is less than 8 nm.

4. The medium according to claim 2, wherein the second metal underlayer is a member selected from the group consisting of copper, silver, and gold.

5. The medium according to claim 4, wherein the second metal underlayer is copper.

6. The medium according to claim 1, wherein the first metal underlayer has one of a hexagonal close packed structure and a face-centered cubic lattice structure.

7. The medium according to claim 1, wherein the first metal underlayer is a member selected from the group consisting of titanium, palladium, and platinum.

8. The medium according to claim 1, wherein the second metal underlayer has an average layer thickness is less than a 10-point average roughness Rz.

9. The medium according to claim 1, further comprising a soft magnetic layer between the substrate and the first metal underlayer.

10. A perpendicular magnetic recording/reproducing apparatus comprising:
    a perpendicular magnetic recording medium having
    a substrate,
    a multilayered underlayer including a first metal underlayer formed on the substrate, a second metal underlayer formed on the first metal underlayer and having a hole, and a third metal underlayer consisting of ruthenium, formed on the second metal underlayer and directly on the first metal underlayer in the hole, having solid solution properties with respect to the first metal underlayer, and having no solid solution properties with respect to the second metal underlayer, and
    a magnetic recording layer formed on the multilayered underlayer; and
    a single-pore magnetic head.

11. The apparatus according to claim 10, wherein the second metal underlayer has one of a hexagonal close packed structure and a face-centered cubic lattice structure.

12. The apparatus according to claim 10, wherein an average crystal grain diameter of the ruthenium is less than 8 nm.

13. The apparatus according to claim 11, wherein the second metal underlayer is a member selected from the group consisting of copper, silver, and gold.

14. The apparatus according to claim 13, wherein the second metal underlayer is copper.

15. The apparatus according to claim 10, wherein the first metal underlayer has one of a hexagonal close packed structure and a face-centered cubic lattice structure.

16. The apparatus according to claim 10, wherein the first metal underlayer is a member selected from the group consisting of titanium, palladium, and platinum.

17. The apparatus according to claim 10, wherein the second metal underlayer is formed by sputtering such that an average layer thickness is less than a 10-point average roughness Rz.

18. The apparatus according to claim 10, further comprising a soft magnetic layer between the substrate and the first metal underlayer.

* * * * *